(12) United States Patent
Chuang et al.

(10) Patent No.: US 9,928,645 B2
(45) Date of Patent: Mar. 27, 2018

(54) RASTER-BASED MESH DECIMATION

(71) Applicant: MICROSOFT TECHNOLOGY LICENSING, LLC, Redmond, WA (US)

(72) Inventors: Ming Chuang, Bellevue, WA (US); Dave B. Lindsay, Kirkland, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 75 days.

(21) Appl. No.: 14/690,205

(22) Filed: Apr. 17, 2015

(65) Prior Publication Data

US 2016/0307367 A1 Oct. 20, 2016

(51) Int. Cl.
*G06T 17/20* (2006.01)
*G06T 17/00* (2006.01)
*G06T 15/40* (2011.01)
*G06T 15/20* (2011.01)
*G06T 7/40* (2017.01)
*G06T 7/60* (2017.01)
(Continued)

(52) U.S. Cl.
CPC ............ *G06T 17/20* (2013.01); *G06K 9/52* (2013.01); *G06T 7/40* (2013.01); *G06T 7/60* (2013.01); *G06T 15/04* (2013.01); *G06T 15/20* (2013.01); *G06T 15/40* (2013.01); *G06T 17/00* (2013.01); *G06T 17/205* (2013.01); *G06T 19/00* (2013.01); *G06T 2200/08* (2013.01); *G06T 2207/10028* (2013.01); *G06T 2210/36* (2013.01); *G06T 2210/56* (2013.01)

(58) Field of Classification Search
CPC ....... G06T 17/20; G06T 17/205; G06T 15/20; G06T 15/205; G06T 15/40; G06T 15/405
See application file for complete search history.

(56) References Cited

U.S. PATENT DOCUMENTS 5,894,308 A 4/1999 Isaacs
6,222,555 B1 * 4/2001 Christofferson ........ G06T 15/04
345/428
(Continued)

OTHER PUBLICATIONS

Dunn, Enrique, and Jan-Michael Frahm. "Next Best View Planning for Active Model Improvement." BMVC. 2009.*
(Continued)

*Primary Examiner* — Daniel Hajnik
(74) *Attorney, Agent, or Firm* — Scott Y. Shigeta; Newport IP, LLC

(57) ABSTRACT

Concepts and technologies are described herein for providing raster-based mesh decimation. Generally described, input data defining a model is processed to render the model as a depth map from a multitude of perspectives. By capturing depth map data from a multitude of perspectives, components of the model that are visible from the multitude of perspectives are captured in the depth map data and components that are blocked by the visible components are not captured in the depth map data. Point cloud data is generated by merging the depth map data captured from the multitude of perspectives. Output mesh data is generated by applying a surface reconstruction to the point cloud data. One or more mesh decimation algorithms may be applied to the mesh data. Image data may also be captured from the input data and applied to the output mesh data.

17 Claims, 9 Drawing Sheets

(51) Int. Cl.
*G06T 19/00* (2011.01)
*G06K 9/52* (2006.01)
*G06T 15/04* (2011.01)

(56) References Cited

U.S. PATENT DOCUMENTS

| | | | | |
|---|---|---|---|---|
| 6,262,738 | B1* | 7/2001 | Gibson | G06T 15/06 345/419 |
| 6,750,873 | B1 | 6/2004 | Bernardini et al. | |
| 8,654,121 | B1* | 2/2014 | Yu | G06T 17/205 345/419 |
| 8,773,423 | B2 | 7/2014 | Sun et al. | |
| 2002/0130856 | A1* | 9/2002 | Perry | G06T 17/00 345/420 |
| 2005/0168460 | A1* | 8/2005 | Razdan | G06F 17/30398 345/419 |
| 2006/0152507 | A1 | 7/2006 | Lee et al. | |
| 2009/0002368 | A1 | 1/2009 | Vitikainen et al. | |
| 2010/0156906 | A1* | 6/2010 | Montgomery | G06T 15/205 345/427 |
| 2014/0192050 | A1* | 7/2014 | Qiu | G06K 9/00214 345/420 |
| 2014/0253551 | A1* | 9/2014 | Schmidt | G06T 15/00 345/427 |
| 2014/0320491 | A1* | 10/2014 | Dai | G06T 17/00 345/420 |
| 2015/0161812 | A1* | 6/2015 | Weill | G06T 15/205 345/419 |
| 2016/0061954 | A1* | 3/2016 | Walsh | G01S 17/89 356/139.03 |

OTHER PUBLICATIONS

Agarwal, S., Furukawa, Y., Snavely, N., Curless, B., Seitz, S. M., & Szeliski, R. (2010). Reconstructing rome. Computer, 43(6), 40-47.*
Snavely, Noah, Steven M. Seitz, and Richard Szeliski. "Modeling the world from internet photo collections." International Journal of Computer Vision 80.2 (2008): 189-210.*
"International Search Report and Written Opinion Issued in PCT Application No. PCT/US2016/025963", dated May 30, 2016, 14 Pages.
Kim, et al., "Natural-Textured Mesh Stream Modeling from Depth Image-Based Representation", In Proceedings of the 6th international conference on Computational Science and Its Applications—Part I, vol. 3980, May 8, 2006, pp. 480-489, 10 pages.
Li, et al., "Pseudo-Immersive Real-Time Display of 3D Scenes on Mobile Devices", In Proceedings of International Conference on 3D Imaging, Modeling, Processing, Visualization and Transmission, May 16, 2011, 8 Pages.
Niu, et al., "Reconstruction of 3D Scenes from Sequences of Images", In Proceedings of SPIE 8913, International Symposium on Photoelectronic Detection and Imaging, Aug. 20, 2013, 8 Pages.
"Second Written Opinion Issued in PCT Application No. PCT/US2016/025963", dated Aug. 2, 2016, 9 Pages.
"International Preliminary Report on Patentability Issued in PCT Application No. PCT/US2016/025963", dated Mar. 1, 2017, 10 Pages.
Song, et al., "Sliding Shapes for 3D Object Detection in Depth Images", In Proceedings of 13th European Conference, Zurich, Switzerland, Part VI, Sep. 6, 2011, 18 pages.
Song, et al., "3D Mesh and Multi-View Synthesis Implementation Using Stereo Cameras and a Depth Camera", In Proccedings of Transmission and Dispaly of 3D Video, 3DTV-Conference: The True Vision-Capture, Oct. 7, 2013, 3 pages.
Xie, et al., "Piecewise C1 Continuous Surface Reconstruction of Noisy Point Clouds via Local Implicit Quadric Regression", In Proceedings of the 14th IEEE Visualization, Oct. 19, 2003, 8 pages.
Callieri, et al., "Reconstructing Textured Meshes from Multiple Range+Rgb Maps", In Proceedings of in 7th Intl Fall Workshop on Vision, Modeling, and Visualization, Nov. 20, 2002, 8 pages.
Kobbelt, et al., "A General Framework for Mesh Decimation", In Proceedings of Graphics Interface, Jun. 1998, 8 pages.
Luebke, David P., "A Developer's Survey of Polygonal Simplification Algorithms",In Journal of IEEE Computer Graphics and Applications, vol. 21, Issue 3, May 2001, 12 pages.
"Optimizing Large 3D Models for the Web", Retrieved on: Dec. 4, 2014, Available at: http://kb.kaon.com/general-information/kaon-technology/optimizing-large-3d-models-for-the-web.
Zhang, et al., "Visibility-Guided Simplification", In Proceedings of the conference on Visualization, Oct. 27, 2002, 8 pages.
"Mesh Processing Applying MeshLab", Published on: Oct. 23, 2013, Available at: http://www.scanner.imagefact.de/gb/mesh.html.
Verlani, et al., "Depth Images: Representations and Real-time Rendering", In Proceeding of Third International Symposium on 3D Data Processing, Visualization, and Transmission, Jun. 14, 2006, 8 pages.
Porquet, et al., "Real-Time High-Quality View-Dependent Texture Mapping using Per-Pixel Visibility", In Proceedings of the 3rd international conference on Computer graphics and interactive techniques in Australasia and South East Asia, Nov. 29, 2005, 8 pages.
Hołowko, et al., "Color-Based Algorithm for Automatic Merging of Multiview 3D Point Cloud", In Journal on Computing and Cultural Heritage vol. 7, Issue 3, Aug. 1, 2014, 21 pages.
Yemeza, et al., "3D Reconstruction of Real Objects with High Resolution Shape and Texture", In Proceedings of Image and Vision Computing, vol. 22, Issue 13, Nov. 1, 2004, 17 pages.
Shade, et al., "Layered Depth Images", In Proceedings of the 25th Annual Conference on Computer Graphics and Interactive Techniques, Jul. 19, 1998, 13 pages.
Ono, et al., "Poisson Surface Reconstruction with Local Mesh Simplification", Published on: Dec. 8, 2014, 2 pages.
Franc, et al., "Parallel Triangular Mesh Decimation without Sorting", In Proceedings of the 17th Spring Conference on Computer Graphics, Apr. 25, 2001, 8 pages.
Kazhdan, et al., "Poisson Surface Reconstruction", In Proceedings of the Fourth Eurographics Symposium on Geometry Processing, Jun. 26, 20006, 10 pages, Jun. 26, 2006.

* cited by examiner (point cloud)

(output of surface
reconstruction process)

(Mesh Data texturized
using RGB Image Data)

RASTER-BASED MESH DECIMATION

BACKGROUND

There is a growing population of users that interact with computing devices that utilize three-dimensional (3D) display technologies. Some 3D models can be very complex and have very high polygon counts, sometimes so much that it is difficult to render with real-time performance and memory constraints. To address some of these constraints, mesh decimation algorithms are used to create simplified versions of 3D models with reduced polygon counts. Although a reduced polygon count may help with some of the performance and computing resource issues, such technologies have a number of drawbacks. Among other problems, a reduced polygon count may create holes and gaps in unbefitting locations of modeled objects.

In one illustrative example, 3D mesh data may include a number of components, e.g., a number of triangles that make up the surfaces of a cube. The data defining the triangles may not indicate that certain triangles are connected. For instance, 3D mesh data may define triangles that make up the front face of the cube, however, the data may not indicate if the triangles are connected. Such data is referred to as "polygon soup." Traditional mesh decimation technologies may not be effective in reducing the number of polygons when processing such data because the removal of random components may remove salient components, such as one or more triangles that make up the front face of the cube. In addition, traditional mesh decimation technologies may not be able to remove hidden components, e.g., internal components. Such an outcome may not be desirable as such techniques may leave unwanted holes or may even render an object in an unrecognizable form.

It is with respect to these and other considerations that the disclosure made herein is presented.

SUMMARY

Concepts and technologies are described herein for providing raster-based mesh decimation. Generally described, input data defining a model is processed to render the model as a depth map from a multitude of perspectives. The location of the perspectives and/or the number of perspectives is based on one or more factors including characteristics defined in the input data and/or other contextual information. By capturing depth map data from a multitude of perspectives, components of the model that are visible from the multitude of perspectives are captured in the depth map data and components that are blocked by the visible components are not captured in the depth map data. Point cloud data is generated by merging the depth map data captured from the multitude of perspectives. Mesh data is generated by applying a surface reconstruction to the point cloud data. A mesh decimation algorithm may be applied to the mesh data. In some configurations, techniques described herein may also render the model to generate image data from the multitude of perspectives. The mesh data may be texturized or otherwise supplemented using the image data.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
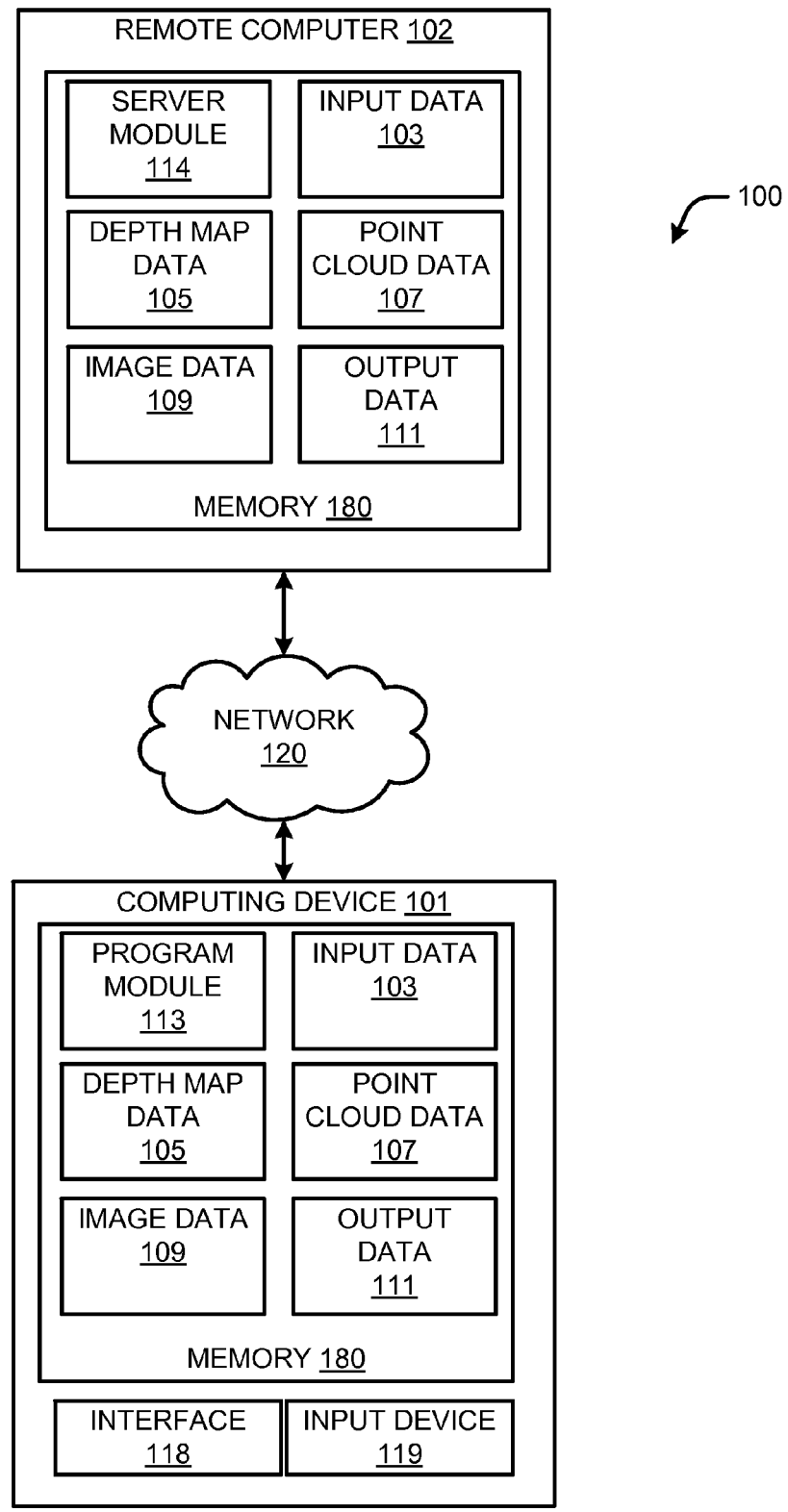
FIG. 1 is a block diagram showing several example components for providing raster-based mesh decimation.

Concepts and technologies are described herein for providing raster-based mesh decimation. Generally described, input data defining a model is processed to render the model as a depth map from a multitude of perspectives. The location of the perspectives and/or the number of perspectives is based on one or more factors including data defined by the input data and/or other contextual information. In some configurations, data representing the location of the perspectives and/or the number of perspectives may be displayed to a user and modified by an input, including a user input in response to the display.

By capturing depth map data from a multitude of perspectives, components of the model that are visible from the multitude of perspectives are captured in the depth map data and components that are blocked by the visible components are not captured in the depth map data. Point cloud data is generated by merging the depth map data captured from the multitude of perspectives. Output mesh data is generated by applying a surface reconstruction to the point cloud data. A mesh decimation algorithm may be applied to the output mesh data. In some configurations, a mesh decimation algorithm may be applied to the output mesh data as an independent process or as part of the surface reconstruction of the point cloud data.

In some configurations, techniques described herein may also render the model to capture image data from the multitude of perspectives. In some examples, the captured image data may include RGB image data, CMYK image data or data defining textures, shaders, normal maps, or any other display properties. If image data is captured, as will be described in more detail below, the captured image data may be applied to the output mesh data. Any number of known methods for applying image data may be used, e.g., texturizing, wrapping, etc.

In some illustrative examples, the input data may comprise an original mesh associated with texels, e.g., encoded colors, normals, etc. Aspects of the present disclosure stores the texels by their spatial location. Once the output mesh data is generated from the point cloud data, the techniques disclosed herein can recover information associated with the texels by sampling the output mesh data. In some configurations, for individual samples, techniques disclosed herein search for certain texels, which may include the nearest texels. Such configurations may be optimized by leveraging a space-partitioning data structure, such as a KD-tree or an Octree.

By the use of the techniques disclosed herein, the generation of mesh data with a reduced polygon count may help with some of the performance and computing resource issues that impact some existing technologies. In addition, the use of the multiple perspectives for capturing data helps produce a reduced polygon count while mitigating issues resulting in holes or gaps in salient features of modeled objects. The technologies presented herein also filter and remove hidden components, e.g., internal components, that may not be considered as salient features from one or more selected perspectives. Data related to the perspectives may also be displayed to a user, which enables the user to provide feedback on the multiple perspectives. These techniques and others may increase the performance of the user and reduce user errors when interacting with the device.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which are shown by way of illustration specific configurations or examples. Referring now to the drawings, in which like numerals represent like elements throughout the several figures, aspects of a computing system and methodology for providing raster-based mesh decimation will be described.

FIG. 1 is a system diagram showing aspects of one illustrative mechanism disclosed herein for providing raster-based mesh decimation. As shown in FIG. 1, a system 100 may include a computing device 101, a remote computer 102 and a network 120. The computing device 101 may operate as a stand-alone device, or the computing device 101 may operate in conjunction with the remote computer 102. As can be appreciated, the remote computer 102 and the computing device 101 are interconnected through one or more local and/or wide area networks, such as the network 120. It should be appreciated that many more network connections may be utilized than illustrated in FIG. 1.

The computing device 101 may be in the form of a personal computer, a wearable computer, including a head mounted display (HMD), or any other device having components for rendering one or more objects on a display, such as an interface 118. The computing device 101 may include a local memory 180 that stores input data 103, depth map data 105, point could data 107, image data 109 and output data 111. The computing device 101 may also include a program module 113 configured to manage techniques described herein and interactions between a user and the computing device 101. The program module 113 may be in the form of a game application, a virtual reality application, an operating system component or any other application with features for processing input data 103 to render objects on a display.

The input data 103 may be in any format. In some examples, the input data 103 may include data from a file or any other data structure containing geometric data. Example file formats include but are not limited to 3DMF, Open Game Engine Exchange, 3DML, 3DXML, FBX, X3D and XVL. The input data 103 may include data defining an object associated with a single mesh or multiple objects each defined by a separate mesh.

Using the input data 103, a model may be rendered in memory from a multitude of perspectives. As will be described in more detail below, the number of perspectives may depend on one or more factors including the shape, size and/or characteristics of the model. For example, a polygon count associated with of the input data 103 and/or a vertices count associated with the input data 103 may influence the number and/or position of the perspectives. In some configurations, an increased polygon count and/or an increased vertices count can cause the system 100 to increase the number of perspectives. In addition, other contextual information received from a computer or user may influence the number of perspectives. In some scenarios, contextual information may indicate that a model has flat or curved surfaces. In such scenarios, a model comprising flat surfaces may require fewer perspectives than a model made of curved surfaces. In addition, a model having a curved surface, such as a hemisphere, there may be a number of perspectives uniformly distributed around the curved surface of the model, and fewer perspectives directed to the flat surface of the model. Any received data may influence the position of each perspective and/or the number of perspectives. In one example, contextual data may be interpreted from the input data 103 and other data, such as an input received from a user or data received from any resource.

In some configurations, data representing the position of individual perspectives and/or the number of perspectives may be displayed to a user. Techniques disclosed here may also display user interface (UI) controls for a user to modify the position of individual perspectives and/or the number of perspectives by the use of the UI or other forms of input, such as a voice input or other input mechanism.

Depth map data 105 may be captured from each of the perspectives. Any data format may be used for storing the depth map data 105, which may include data defining a distance between individual perspectives and a modeled object. By capturing depth map data 105 from a multitude of perspectives, components of the object that are visible from the multitude of perspectives are captured in the depth map data 105 and components that are blocked by the visible components are not captured in the depth map data 105.

In addition, in some configurations, image data 109, such as RGB data, CMYK data or other data, may be captured from one or more perspectives. In other examples, data identifying any display property, such as a shading, may be captured from each of the perspectives. The captured image data 109, as will be explained below, can be applied to the output data 111.

The point cloud data 107 is generated by merging the depth map data 105 captured from the multitude of perspectives. Next, output data 111, which may include mesh data, is generated by applying a surface reconstruction process to the point cloud data 107. For illustrative purposes, the output data 111 is also referred to herein as "output mesh data." In some configurations, a mesh decimation algorithm may be applied to the output data 111 either as an independent process or part of the surface reconstruction process. Any compatible mesh decimation technique, including a quadratic-based mesh decimation, may be applied to the output data 111.

In some configurations, when image data 109 is captured from the perspectives, techniques described herein may also apply the image data 109 to the output data 111. This may be done by a number of techniques, which may include texturizing or wrapping the surfaces defined by the output data 111, projecting a rendering of the image data 109 on the surfaces defined by the output data 111 or by the use of any known technique for applying display properties or image data to mesh data.

In some configurations, instead of rendering images for texturing, one approach can involve a process of searching for the closest point on the original model for each point from the decimated mesh. The image data, e.g., color information, can then be transferred once such mapping is established. In some illustrative examples, the input data may comprise an original mesh associated with texels, e.g., encoded colors, normals, etc. Aspects of the present disclosure stores the texels by their spatial location. Once the output mesh data is generated from the point cloud data, the techniques disclosed herein can recover information associated with the texels by sampling the output mesh data. In some configurations, for individual samples, techniques disclosed herein search for certain texels, such as the nearest texels. Such configurations may be optimized by leveraging a space-partitioning data structure, such as KD-tree and Octree.

The program module 113 may also include speech components configured to operate in conjunction with a microphone and a speaker. The speech components may include mechanisms for converting user speech into a computer-readable format, such as a text or binary format. As can be appreciated, data containing speech input, or any other form of user input, may be used to obtain contextual information regarding the input data 103, including data defining a 3D model.

In one illustrative example, the program module 113 is an application that creates or allows a user to interact with a virtual world environment. The virtual world environment may include a model of one or more objects. The program module 113 may be configured to operate with one or more inputs so a user and other resources can provide contextual information regarding a rendered model. As will be described in more detail below, a number of parameters, such as a number of perspectives for capturing depth map data and image data may be influenced by the input data 103, one or more inputs and/or contextual data.

The remote computer 102 may be in the form of a server computer or a number of server computers configured to store and process input data 103, depth map data 105, point could data 107, image data 109 and output data 111. As can be appreciated, the remote computer 102 may store duplicate copies of the data stored in one or more client computers, allowing a centralized service to coordinate a number of client computers, such as the computing device 101.

Figure 2:
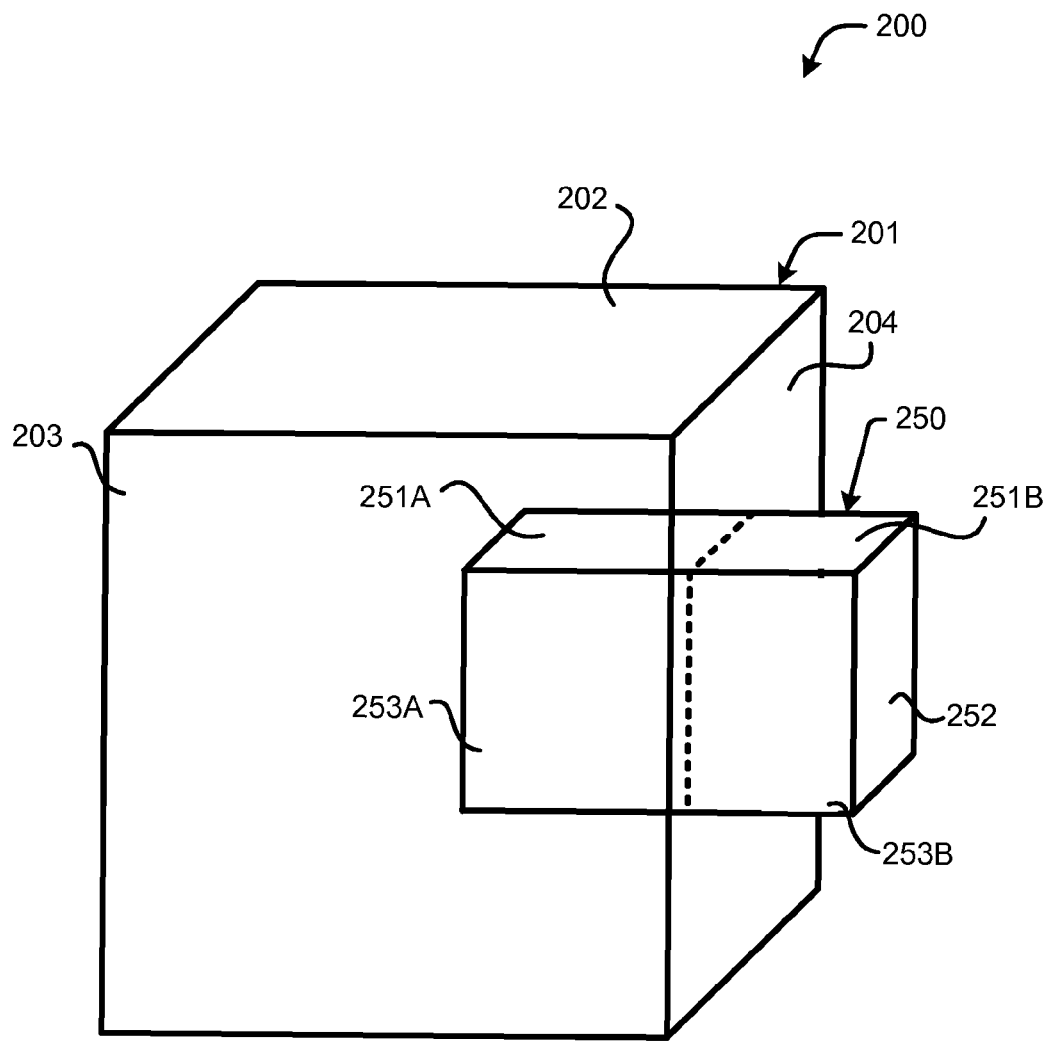
FIG. 2 illustrates a model defined by sample input data comprising geometric data.

Turning now to FIG. 2, aspects of an illustrative example is shown. FIG. 2 illustrates a model 200 that may be defined by sample input data 103. As shown, the model 200 includes a cube 201, having a top 202, a first side 203 and a second side 204. A third side (not shown) that is opposite of the first side 203, a fourth side (not shown) that is opposite the second side 204, and a bottom side (not shown) that is opposite of the top 202.

The model 200 also comprises a block 250 protruding through the second side 204 of the cube 201. As shown, the block 250 comprises a first top section 251A that is positioned inside the cube 201 and a second top section 251B that is positioned outside of the cube 201. For illustrative purposes, the first top section 251A and the second top section 251B are collectively referred to herein as the "top surface 251." The block 250 also comprises a first side section 253A having that is positioned inside the cube 201 and a second side section 253B that is positioned outside of the cube 201. For illustrative purposes, the first side section 253A and the second side section 253B are collectively referred to herein as the "second side surface 253." The block 250 also comprises a first end 252, a second end (not shown) that is opposite of the first end 252, a third side (not shown) that is opposite of the second side surface 253, and a bottom side (not shown) that is opposite of the top surface 251.

In the present example, although the model 200 may appear as on mesh, the input data 103 can define the cube 201 with one mesh and the block 250 with a second mesh. Although this example shows input data 103 having an individual mesh for the cube 201 and an individual mesh for the block 250, the techniques described herein may process input data 103 defining a single mesh or any number of mesh components. In the current example, as will be described in more detail below, input data 103 defining an individual mesh for the cube 201 and an individual mesh for the block 250 can be processed into output data 111 having a single mesh.

As summarized above, the techniques described herein capture depth map data from a multitude of perspectives. In some configurations, the number of perspectives and the position of individual perspectives may be based on one or more factors including characteristics of the input data 103 and/or other contextual information. For example, input data 103 having a high polygon count and/or a high number of vertices, may cause the system 100 to use an increased number of perspectives. As also described herein, an input from a user or other information indicating the context of the model may influence the number of perspectives and/or the position of individual perspectives. For instance, if an input from a user indicates that the model includes flat surfaces, techniques may use fewer perspectives than a model having curved surfaces. The position of each perspective and/or the number of perspectives may depend on contextual data interpreted from the input data 103 and other data.

Figure 3A:
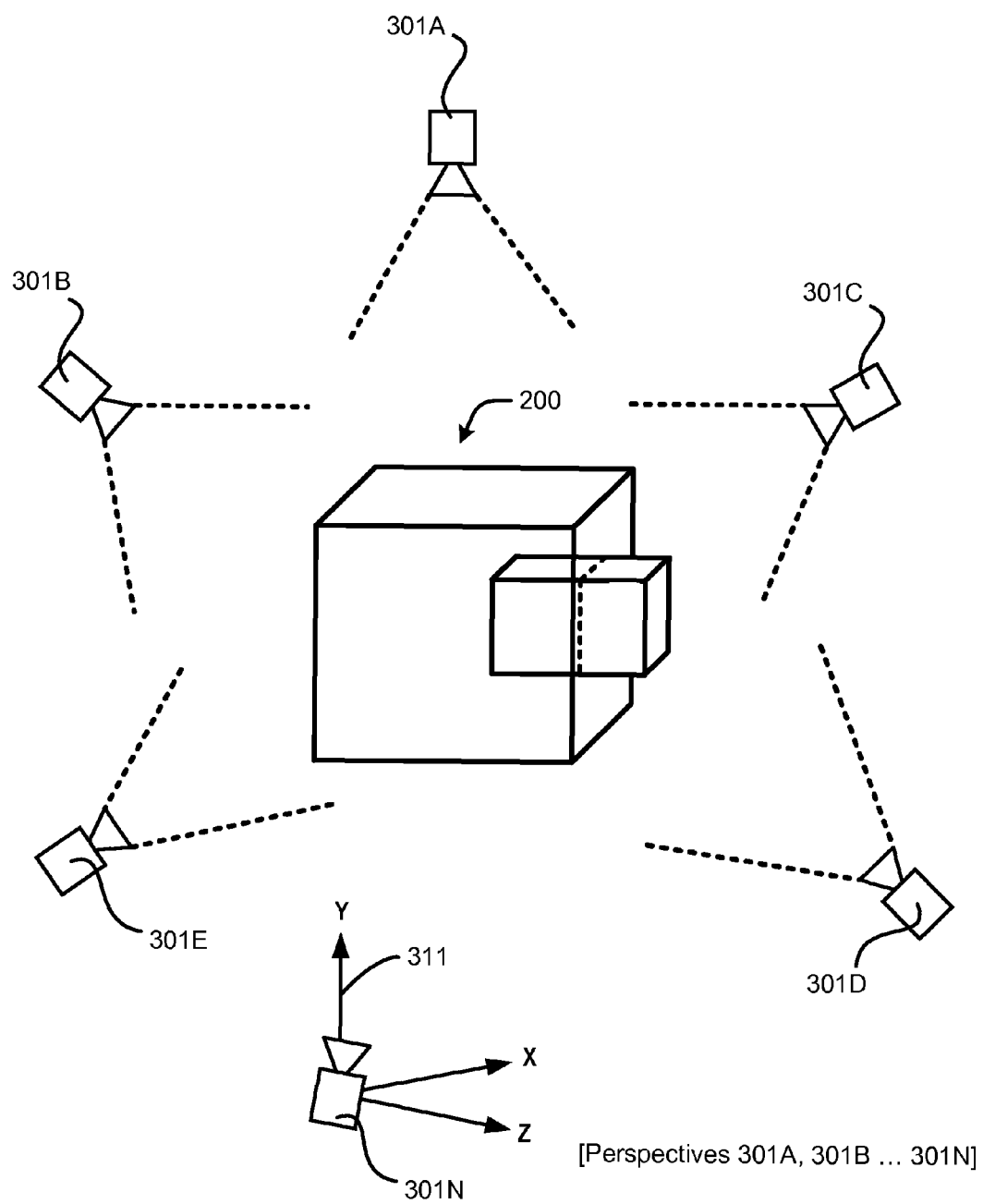
FIG. 3A illustrates a number of perspectives for capturing depth map data of the model.

In another example, a visual display of the number of perspectives and/or the position of individual perspectives may be shown to the user, such as the drawing in FIG. 3A. Upon inspection of the visual display, a user may provide an input to the system 100 to increase or decrease the number of perspectives and/or move the position of individual perspectives.

In applying the example model 200 to the techniques described herein, FIG. 3A illustrates number of perspectives for capturing depth map data of the model 200. As shown, there may be a number of perspectives (301A-301N) distributed around the model 200. For example, a first perspective 301A may be positioned over the model 200, a second perspective 301B may be positioned over the fourth side and directed to the top of the model 200. Other perspectives may be positioned around the model 200 to capture depth map data of each surface. It can be appreciated that the number of perspective may be less than or greater than the number of perspectives shown in FIG. 3A. In addition, it can be appreciated that individual perspectives may be in any position relative to the model 200 as indicated by the illustrated coordinates 311. Each perspective may include data indicating a location of a perspective, a direction of a view and other data.

Figure 3B:
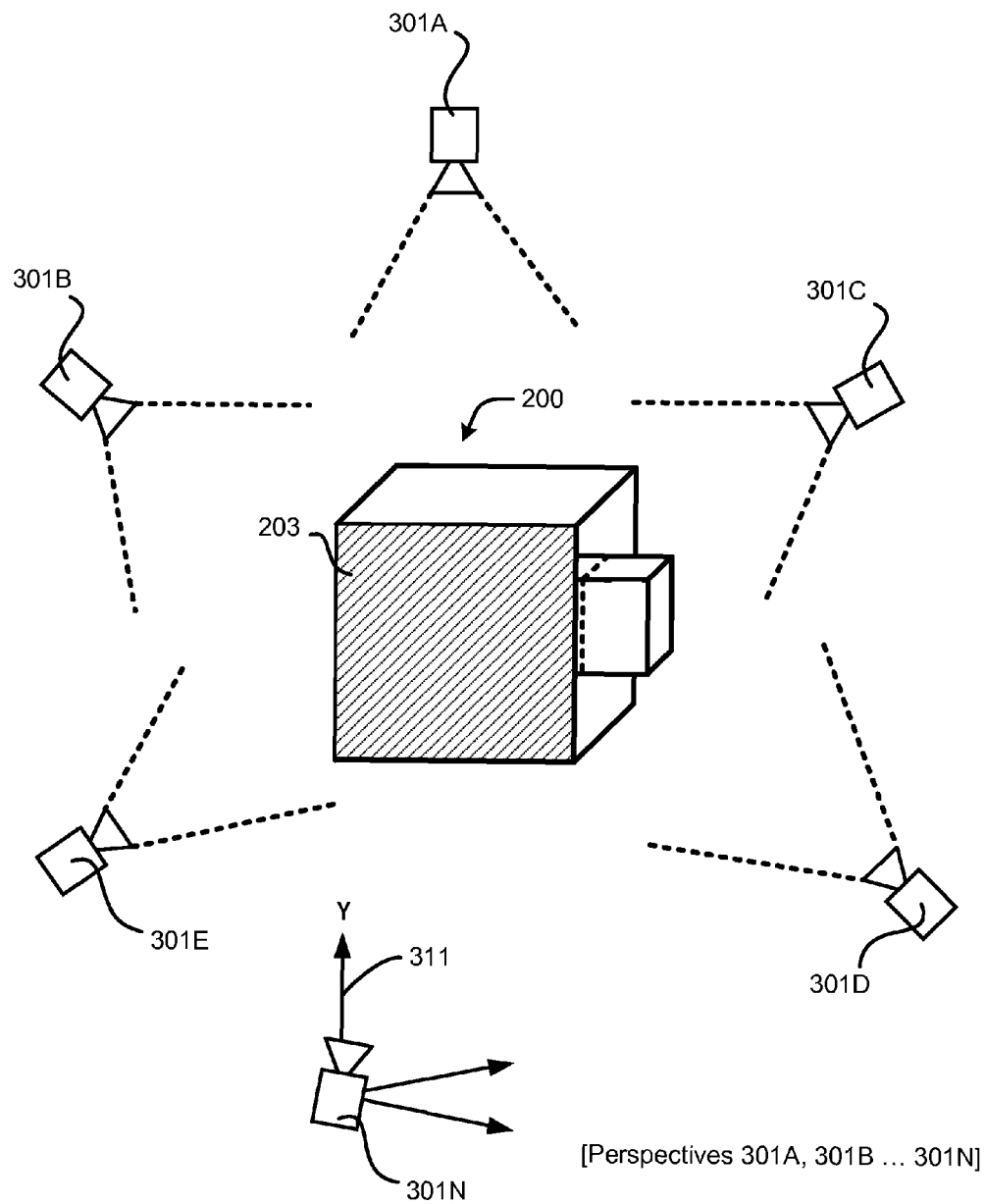
FIG. 3B illustrates a number of perspectives for capturing image data of the model.

In some configurations, techniques described herein may also render the model 200 to generate at least one image from the multitude of perspectives. In some configurations, a RGB image or any other type of image may be generated from the individual perspectives. FIG. 3B illustrates an example texture that may be captured from the first side 203. One or more of the perspectives 301A-301N may be used to capture and record image data, which may include any type of data, such as shading, texture, color or any other display property.

Figure 4A:
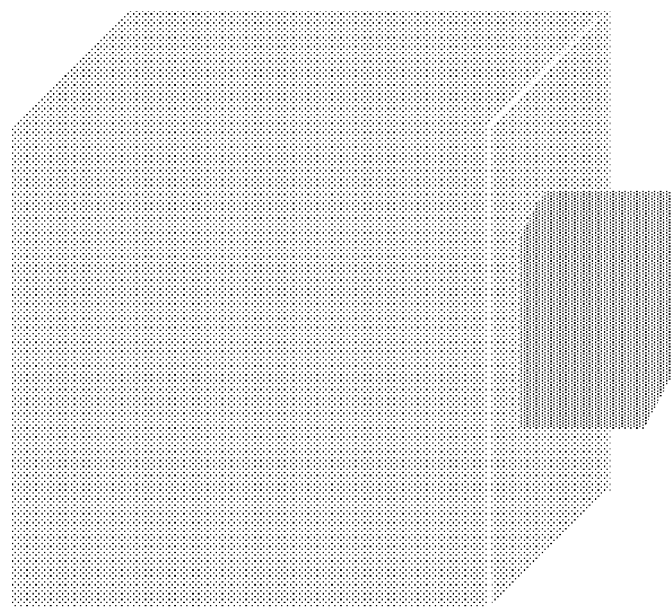
FIG. 4A illustrates a representation of the model based on point cloud data generated from the depth map data.

As also summarized above, point cloud data is generated by merging the depth map data captured from the multitude of perspectives. The depth map data may be processed by any known techniques for generating point cloud data. In some configurations, the depth map data can be used to generate 3D coordinates for individual points. Those points may be used to generate a point cloud. FIG. 4A shows an example illustration of a point cloud that may be generated from the depth map data.

Figure 4B:
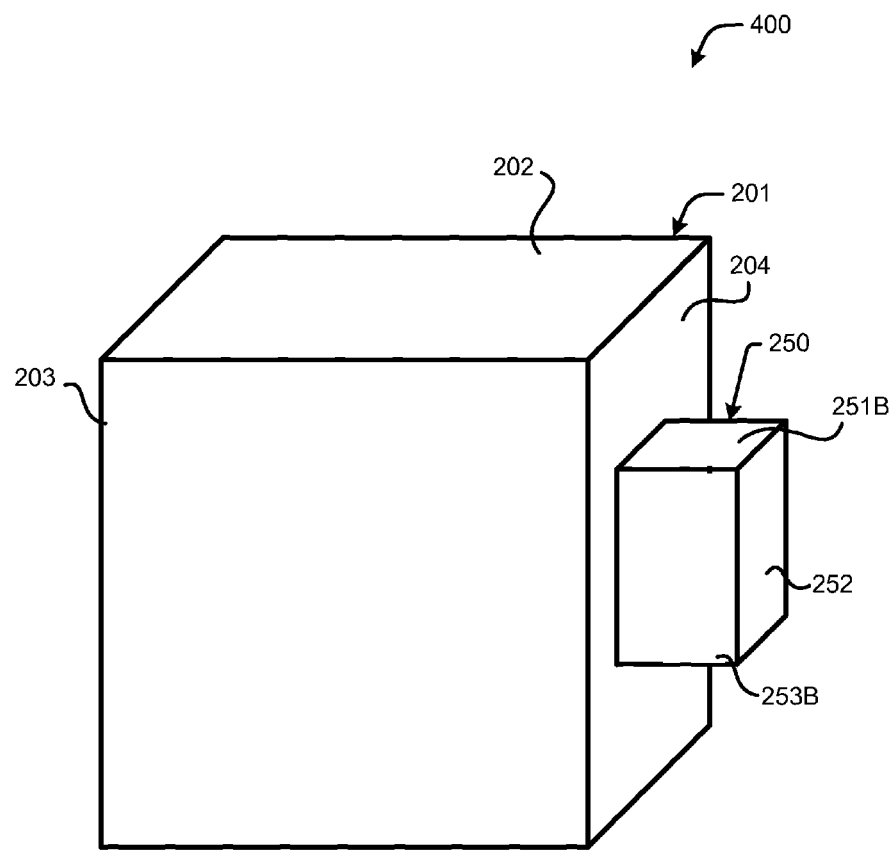
FIG. 4B illustrates a representation of the model based on mesh data generated from a surface reconstruction of the point cloud data.
Figure 4C:
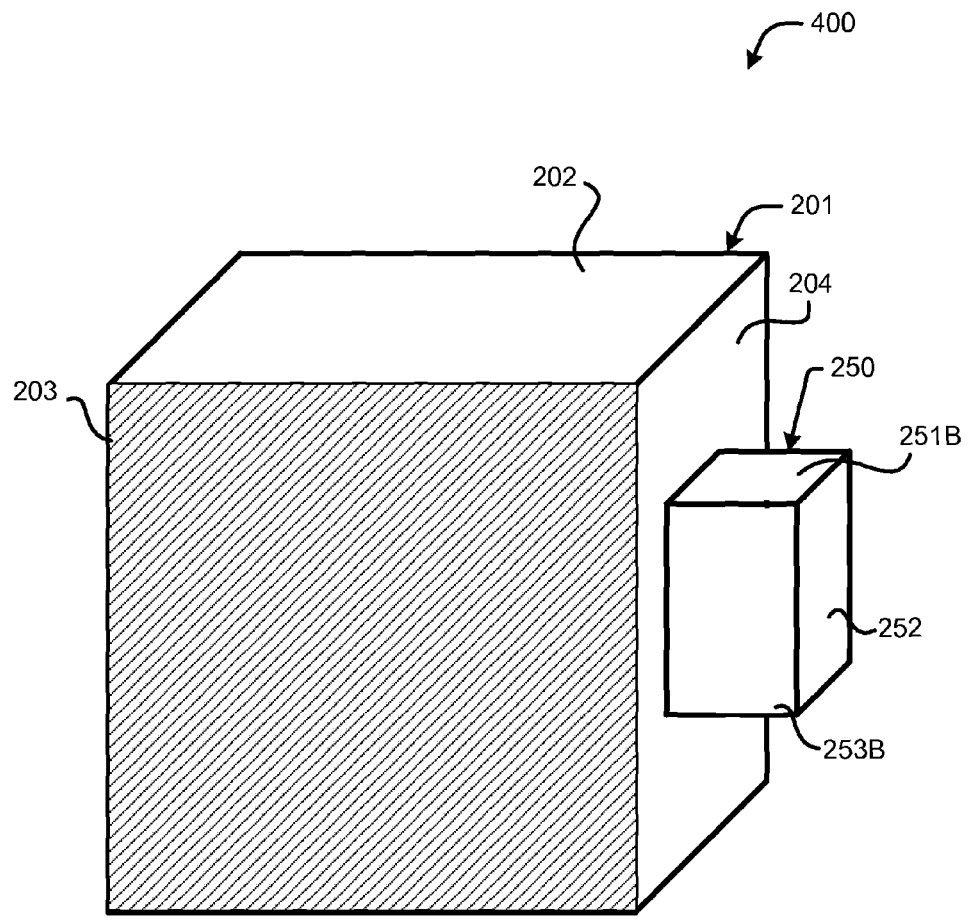
FIG. 4C illustrates a texturized representation of the model based on the image data.

The point cloud data is then applied to a surface reconstruction process to generate output mesh data 111. Any known method for generating mesh data 111 from point cloud data may be used. FIG. 4B shows an example representation of mesh data of the present example. In the present example, since the multitude of perspectives were used to capture the depth map data, the mesh data generated in this stage may include one mesh. As described above, in the current example, the input data 103 included more than one mesh: one for the cube 201 and one for the block 250. As a result of the processing of the input data 103, the mesh data generated from the point cloud data only includes a single mesh. As also shown, the output mesh data 111 does not include the first top section 251A that is positioned inside the cube 201, however the output mesh data does include the second top section 251B. As also described above, one or more mesh decimation algorithms may be applied to the output mesh data 111.

Next, if image data is captured from the input data 103, the captured image data 109 is applied to the output mesh data 111. The image data 109 may be applied to the mesh data using any method. For example, the mesh data may be texturized by projecting colors from the image data 109, which may be in the form of RGB image data or any other type of image data.

Figure 5:
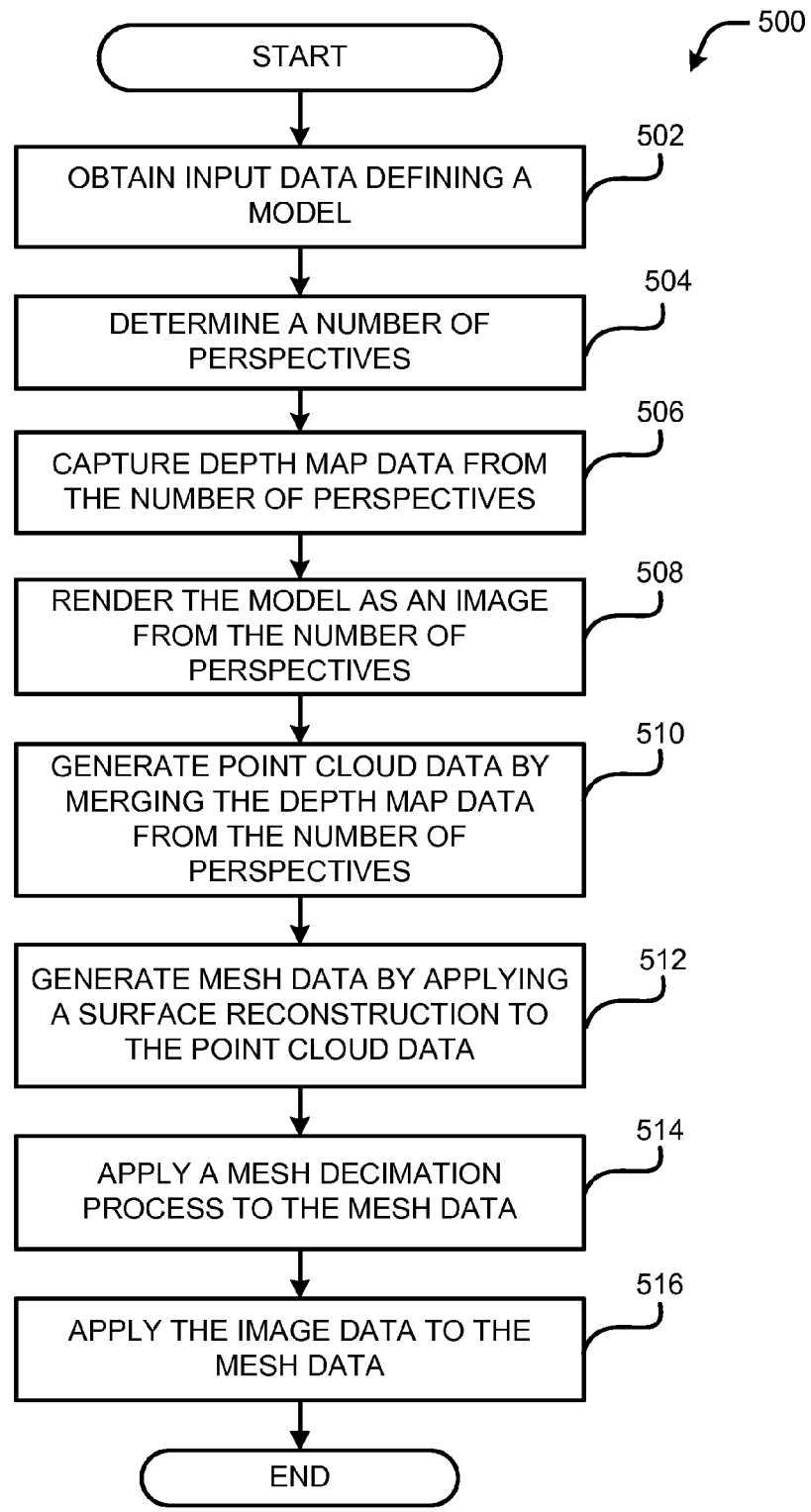
FIG. 5 is a flow diagram of one example routine that may be used for providing raster-based mesh decimation.

Turning now to FIG. 5, aspects of a routine 500 for providing raster-based mesh decimation are shown and described below. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in its entirety. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As will be described in more detail below, in conjunction with FIG. 1, the operations of the routine 500 are described herein as being implemented, at least in part, by an application, component and/or circuit, such as the program module 113 and/or the server module 114. Although the following illustration refers to the components of FIG. 1, it can be appreciated that the operations of the routine 500 may be also implemented in many other ways. For example, the routine 500 may be implemented, at least in part, by computer processor or processor of another computer. In addition, one or more of the operations of the routine 500 may alternatively or additionally be implemented, at least in part, by a chipset working alone or in conjunction with other software modules. Any service, circuit or application suitable for providing contextual data indicating the position or state of any device may be used in operations described herein.

With reference to FIG. 5, the routine 500 begins at operation 502, where input data 103 is obtained. The input data 103 may be in any format and may be from any resource. In some examples, the input data 103 may include data from a file or any other data structure containing geometric data. Example file formats include but are not limited to 3DMF, Open Game Engine Exchange, 3DML, 3DXML, FBX, X3D and XVL. The input data 103 may include data defining an object associated with a single mesh or multiple objects each defined by a separate mesh.

Next, at operation 504, the system 100 determines a number of perspectives. As summarized above, the number of perspectives may depend on one or more factors including the aspects of the input data 103 and/or characteristics of the model. For example, a polygon count associated with of the input data 103 and/or a vertices count associated with the input data 103 may influence the number and/or position of the perspectives. In some configurations, an increased polygon count and/or an increased vertices count can lead to an increased number of perspectives. In addition, other contextual information received from a computer or user may influence the number of perspectives.

In addition to determining the number of perspectives, operation 504 may also include techniques that determine the location of the perspectives. The location of the perspectives may depend on one or more factors, including aspects of the input data 103. Any received data may influence the position of each perspective and/or the number of perspectives. In one example, contextual data may be interpreted from the input data 103 and other data, such as an input received from a user or data received from any resource. The position of individual perspectives and/or the number of perspectives may be based on the contextual data. In addition, a UI showing the position of individual perspectives may be displayed to a user. The UI may be configured with controls, which may include touch input components configured to allow the user to change the number of perspectives and/or the position of individual perspectives.

Next, at operation 506, the system 100 captures depth map data 105 from the number of perspectives. In some configurations, a model may be rendered in memory from the perspectives. From each perspective, a depth value and other data, which may include distance and coordinate information, may be stored in memory. By capturing depth map data 105 from a multitude of perspectives, components of a model that are visible from the multitude of perspectives are captured in the depth map data 105 and components that are blocked by the visible components are not captured in the depth map data 105.

Next, at operation 508, as an optional process, the system 100 may capture image data 109 from the number of perspectives. This may include interpreting a rendering of a model to obtain image data, such as RGB data or CMYK data. Operation 508 may also include the collection of other data, such an indicator of the location of the image data. For instance, in the example of FIG. 3B, one or more data structures may indicate that a texture, shade, image or other display properties are associated with a component, such as the first side 203 of the model.

Next, at operation 510, the system 100 generates point cloud data 107 by merging the depth map data 105. The depth map data 105 may be processed by any known techniques for generating point cloud data 107.

Next, at operation 512, the system 100 generates output mesh data 111, which may be in the form of mesh data, is generated by applying a surface reconstruction process to the point cloud data 107.

Next, at operation 514, the system 100 may apply a mesh decimation algorithm to the output mesh data 111, e.g., the mesh data. This operation may be applied either as a stand-alone process (operation 514) or part of the surface reconstruction process of operation 512.

Next, at operation 516, the system 100 may apply the image data 109 to the output mesh data 111. In operation 516, any known method for applying image data 109 or any other image properties to geometric data may be used. This process may involve a wrapping of an image, an application of a shade or any other display property.

Figure 6:
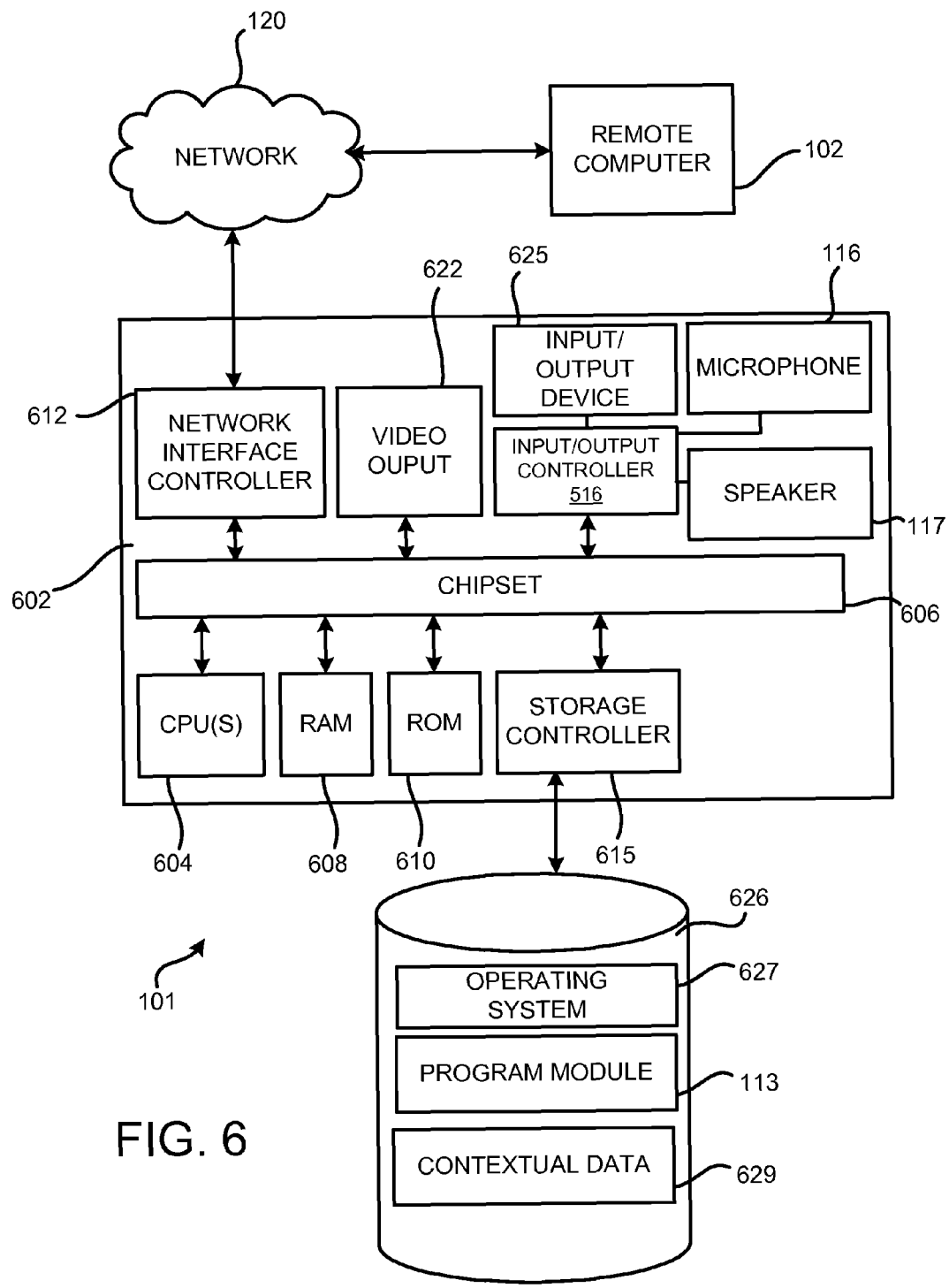
FIG. 6 is a computer architecture diagram showing an illustrative computer hardware and software architecture for a computing device capable of implementing aspects of the configurations presented herein.

FIG. 6 shows additional details of an example computer architecture for the components shown in FIG. 1 capable of executing the program components described above for providing raster-based mesh decimation. The computer architecture shown in FIG. 6 illustrates a game console, conventional server computer, workstation, desktop computer, laptop, tablet, phablet, network appliance, personal digital assistant ("PDA"), e-reader, digital cellular phone, or other computing device, and may be utilized to execute any of the software components presented herein. For example, the computer architecture shown in FIG. 6 may be utilized to execute any of the software components described above. Although some of the components described herein are specific to the computing device 101, it can be appreciated that such components, and other components may be part of the remote computer 102.

The computing device 101 includes a baseboard 602, or "motherboard," which is a printed circuit board to which a multitude of components or devices may be connected by way of a system bus or other electrical communication paths. In one illustrative configuration, one or more central processing units ("CPUs") 604 operate in conjunction with a chipset 606. The CPUs 604 may be standard programmable processors that perform arithmetic and logical operations necessary for the operation of the computing device 101.

The CPUs 604 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 606 provides an interface between the CPUs 604 and the remainder of the components and devices on the baseboard 602. The chipset 606 may provide an interface to a RAM 608, used as the main memory in the computing device 101. The chipset 606 may further provide an interface to a computer-readable storage medium such as a read-only memory ("ROM") 610 or non-volatile RAM ("NVRAM") for storing basic routines that help to startup the computing device 101 and to transfer information between the various components and devices. The ROM 610 or NVRAM may also store other software components necessary for the operation of the computing device 101 in accordance with the configurations described herein.

The computing device 101 may operate in a networked environment using logical connections to remote computing devices and computer systems through a network, such as the local area network 120. The chipset 606 may include functionality for providing network connectivity through a network interface controller (NIC) 612, such as a gigabit Ethernet adapter. The NIC 612 is capable of connecting the computing device 101 to other computing devices over the network 120. It should be appreciated that multiple NICs 612 may be present in the computing device 101, connecting the computer to other types of networks and remote computer systems. The network 120 allows the computing device 101 to communicate with remote services and servers, such as the remote computer 102. As can be appreciated, the remote computer 102 may host a number of services such as the XBOX LIVE gaming service provided by MICROSOFT CORPORATION of Redmond Wash. In addition, as described above, the remote computer 102 may mirror and reflect data stored on the computing device 101 and host services such as those performed by the program module 113.

The computing device 101 may be connected to a mass storage device 626 that provides non-volatile storage for the computing device. The mass storage device 626 may store system programs, application programs, other program modules, and data, which have been described in greater detail herein. The mass storage device 626 may be connected to the computing device 101 through a storage controller 615 connected to the chipset 606. The mass storage device 626 may consist of one or more physical storage units. The storage controller 615 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units. It should also be appreciated that the mass storage device 626, other storage media and the storage controller 615 may include MultiMediaCard (MMC) components, eMMC components, Secure Digital (SD) components, PCI Express components, or the like.

The computing device 101 may store data on the mass storage device 626 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 626 is characterized as primary or secondary storage, and the like.

For example, the computing device 101 may store information to the mass storage device 626 by issuing instructions through the storage controller 615 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 101 may further read information from the mass storage device 626 by detecting the physical states or characteristics of one or more particular locations within the physical storage units.

In addition to the mass storage device 626 described above, the computing device 101 may have access to other computer-readable media to store and retrieve information, such as program modules, data structures, or other data. Thus, although the program module 113 and other modules are depicted as data and software stored in the mass storage device 626, it should be appreciated that these components and/or other modules may be stored, at least in part, in other computer-readable storage media of the computing device 101. Although the description of computer-readable media contained herein refers to a mass storage device, such as a solid state drive, a hard disk or CD-ROM drive, it should be appreciated by those skilled in the art that computer-readable media can be any available computer storage media or communication media that can be accessed by the computing device 101.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium that can be used to store the desired information and which can be accessed by the computing device 101. For purposes of the claims, the phrase "computer storage medium," and variations thereof, does not include waves or signals per se and/or communication media.

The mass storage device 626 may store an operating system 627 utilized to control the operation of the computing device 101. According to one configuration, the operating system comprises a gaming operating system. According to another configuration, the operating system comprises the WINDOWS® operating system from MICROSOFT Corporation. According to further configurations, the operating system may comprise the UNIX, ANDROID, WINDOWS PHONE or iOS operating systems, available from their respective manufacturers. It should be appreciated that other operating systems may also be utilized. The mass storage device 626 may store other system or application programs and data utilized by the computing device 101, such as the program module 113, contextual data 629 and/or any of the other software components and data described above. The mass storage device 626 might also store other programs and data not specifically identified herein.

In one configuration, the mass storage device 626 or other computer-readable storage media is encoded with computer-executable instructions which, when loaded into the computing device 101, transform the computer from a general-purpose computing system into a special-purpose computer capable of implementing the configurations described herein. These computer-executable instructions transform the computing device 101 by specifying how the CPUs 604 transition between states, as described above. According to one configuration, the computing device 101 has access to computer-readable storage media storing computer-executable instructions which, when executed by the computing device 101, perform the various routines described above with regard to FIG. 5 and the other figures. The computing device 101 might also include computer-readable storage media for performing any of the other computer-implemented operations described herein.

The computing device 101 may also include one or more input/output controllers 616 for receiving and processing input from a number of input devices, such as a keyboard, a mouse, a microphone, a headset, a touchpad, a touch screen, an electronic stylus, or any other type of input device. Also shown, the input/output controllers 616 is in communication with an input/output device 625. The input/output controller 616 may provide output to a display, such as a computer monitor, a HMD, a flat-panel display, a digital projector, a printer, a plotter, or other type of output device. The input/output controller 616 may provide input communication with other devices such as a microphone 116, a speaker 117, game controllers and/or audio devices. In addition, or alternatively, a video output 622 may be in communication with the chipset 606 and operate independent of the input/output controllers 616. It will be appreciated that the computing device 101 may not include all of the components shown in FIG. 6, may include other components that are not explicitly shown in FIG. 6, or may utilize an architecture completely different than that shown in FIG. 6.

The disclosure presented herein may be considered in view of the following clauses.

Clause 1: A computing device, comprising: a processor; a memory having computer-executable instructions stored thereupon which, when executed by the processor, cause the computing device to obtain input data comprising geometric data defining one or more models; determine a number of perspectives for capturing depth map data of the one or more models; capture depth map data from the perspectives; and generate point cloud data by merging the depth map data from the perspectives; and generate mesh data by applying a surface reconstruction to the point cloud data, the mesh data defining components of the model that are viewable from the perspectives.

Clause 2: The computing device of clause 1, wherein the memory has further executable instructions stored therein to generate output data by applying a mesh decimation process to the mesh data.

Clause 3: The computing device of clauses 1-2, wherein the input data further comprises image properties and wherein the memory has further executable instructions stored therein to: render the model from the input data to capture image data from the perspectives; and texturize the mesh data utilizing the image data.

Clause 4: The computing device of clauses 1-3, wherein the memory has further executable instructions stored therein to: analyze the input data to determine a context; and determine a position of at least one perspective of the number of perspectives based on, at least in part, on the context.

Clause 5: The computing device of clauses 1-4, wherein the number of perspectives is based on, at least in part, on the context.

Clause 6: The computing device of clauses 1-5, wherein the number of perspectives is based on, at least in part, a polygon count associated with the input data.

Clause 7: The computing device of clauses 1-6, wherein the number of perspectives is based on, at least in part, a vertices count associated with the input data.

Clause 8: The computing device of clauses 1-7, wherein the memory has further executable instructions stored therein to cause a display of data indicating the number of perspectives; and receive additional input data indicating a modification to the number of perspectives or a position of at least one perspective of the number of perspectives.

Clause 9: A computer-implemented method, including obtaining input data comprising geometric data defining one or more models; determining a number of perspectives for capturing depth map data of the one or more models; capturing depth map data from the perspectives; generating point cloud data by merging the depth map data captured from the perspectives; and generating mesh data by applying a surface reconstruction to the point cloud data.

Clause 10: The method of clause 9, wherein generating mesh data further comprises an application of a mesh decimation process to reduce a polygon count of the mesh data.

Clause 11: The method of clauses 9-10, further comprising: rendering the model to generate at least one image from the perspectives; and texturizing the mesh data utilizing the at least one image.

Clause 12: The method of clauses 9-11, further comprising: analyzing the input data to determine a context; and determining a position of at least one perspective of the number of perspectives based on, at least in part, on the context.

Clause 13: The method of clauses 9-12, wherein the number of perspectives is based on, at least in part, on the context.

Clause 14: The method of clauses 9-13, wherein the number of perspectives is based on, at least in part, a polygon count associated with the input data.

Clause 15: The method of clauses 9-14, wherein the number of perspectives is based on, at least in part, a vertices count associated with the input data.

Clause 16: The method of clauses 9-15, further comprising: causing a display of data indicating the number of number of perspectives; and receiving additional input data indicating a modification to the number of perspectives.

Clause 17: A computer-readable storage medium having computer-executable instructions stored thereupon which, when executed by a computer, cause the computer to: obtain input data defining a plurality of three-dimensional components of an object; determine a set of components of the plurality of three-dimensional components that are viewable from a plurality of perspectives; filter a second set of components of the plurality of three-dimensional components that are hidden from the plurality of perspectives; and generate output data defining a three dimensional model of the object utilizing the plurality of components that are viewable from the plurality of perspectives.

Clause 18: The computer-readable storage medium of clause 17, wherein the computer-readable storage medium has further computer-executable instructions stored thereon that cause the computer to: analyze the input data to determine a context; and determine the set of components based on, at least in part, on the context.

Clause 19: The computer-readable storage medium of clauses 17-18, wherein the computer-readable storage medium has further computer-executable instructions stored thereon that cause the computer to: analyze the input data to determine a context; and determine the second set of components based on, at least in part, on the context.

Clause 20: The computer-readable storage medium of clauses 17-19, wherein the computer-readable storage medium has further computer-executable instructions stored thereon that cause the computer to determine a value indicating a number of polygons or a number of vertices associated with the input data; and determine the set of components based on, at least in part, on the value.

Based on the foregoing, it should be appreciated that technologies for providing raster-based mesh decimation are provided herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example configurations and applications illustrated and described, and without departing from the true spirit and scope of the present invention, which is set forth in the following claims.

What is claimed is:

1. A computing device, comprising:
   a processor;
   a memory having computer-executable instructions stored thereupon which, when executed by the processor, cause the computing device to
   obtain input data comprising geometric data defining one or more models in a virtual environment;
   determine a number of perspectives for capturing depth map data of the one or more models, wherein the number of perspectives and positions of the perspectives is based on, at least in part, a polygon count associated with the input data, wherein each perspective of the number of perspectives, which is selected based on the polygon count and used to capture the depth map data, is positioned at a respective virtual position and orientation located in the virtual environment;
   capture depth map data from the perspectives of the one or more models in the virtual environment to filter one or more components of the one or more models that are hidden from the perspectives;
   generate point cloud data by merging the depth map data from the perspectives; and
   generate mesh data by applying a surface reconstruction to the point cloud data, the mesh data defining components of the model that are viewable from the perspectives.

2. The computing device of claim 1, wherein the memory has further executable instructions stored therein to generate output data by applying a mesh decimation process to the mesh data.

3. The computing device of claim 1, wherein the input data further comprises image properties and wherein the memory has further executable instructions stored therein to:
   render the model from the input data to capture image data from the perspectives; and
   texturize the mesh data utilizing the image data.

4. The computing device of claim 1, wherein the memory has further executable instructions stored therein to:
   analyze the input data to determine a context; and
   determine a position of at least one perspective of the number of perspectives based on, at least in part, on the context.

5. The computing device of claim 4, wherein the number of perspectives is based on, at least in part, on the context.

6. The computing device of claim 1, wherein the number of perspectives is based on, at least in part, a polygon count associated with the input data.

7. The computing device of claim 1, wherein the memory has further executable instructions stored therein to
   cause a display of data indicating the number of perspectives; and
   receive additional input data indicating a modification to the number of perspectives or a position of at least one perspective of the number of perspectives.

8. A computer-implemented method, comprising:
   obtaining input data comprising geometric data defining one or more models in a virtual environment;
   determining a number of perspectives for capturing depth map data of the one or more models, wherein the number of perspectives and positions of the perspectives is based on, at least in part, a polygon count associated with the input data, wherein each perspective of the number of perspectives, which is selected based on the polygon count and used to capture the depth map data, is positioned at a respective virtual position and orientation located in the virtual environment;
   filtering one or more components of the one or more models that are hidden from the perspectives by capturing depth map data from the perspectives of the one or more models in the virtual environment;
   generating point cloud data by merging the depth map data captured from the perspectives; and
   generating mesh data by applying a surface reconstruction to the point cloud data.

9. The computer-implemented method of claim 8, wherein generating mesh data further comprises an application of a mesh decimation process to reduce a polygon count of the mesh data.

10. The computer-implemented method of claim 8, further comprising:
    rendering the model to generate at least one image from the perspectives; and
    texturizing the mesh data utilizing the at least one image.

11. The computer-implemented method of claim 8, further comprising:
    analyzing the input data to determine a context; and
    determining a position of at least one perspective of the number of perspectives based on, at least in part, on the context.

12. The computer-implemented method of claim 11, wherein the number of perspectives is based on, at least in part, the context.

13. The computer-implemented method of claim 8, wherein the number of perspectives is based on, at least in part, a vertices count associated with the input data.

14. The computer-implemented method of claim 8, further comprising:
    causing a display of data indicating the number of perspectives; and
    receiving additional input data indicating a modification to the number of perspectives.

15. A computing device, comprising:
    a processor;
    a memory having computer-executable instructions stored thereupon which, when executed by the processor, cause the computing device to:
    obtain input data comprising geometric data defining one or more models in a virtual environment;
    determine a number of perspectives for capturing depth map data of the one or more models, wherein the number of perspectives and positions of the perspectives is based on, at least in part, a polygon count associated with the input data, wherein each perspective of the number of perspectives, which is selected based on the polygon count and used to capture the depth map data, is positioned at a respective virtual position and orientation located in the virtual environment;
    render in memory the geometric data as the depth map data from each of the number of perspectives of the one or more models in the virtual environment;
    merge the depth map data from the number of perspectives to generate point cloud data to filter one or more components of the one or more models that are hidden from the number of perspectives; and apply a surface reconstruction to the point cloud data to generate output mesh data defining surface components of the one or more models that are visible from the number of perspectives.

16. The computing device of claim 15, wherein the memory has further executable instructions stored therein to:
analyze the input data to determine a context; and
determine a position of at least one perspective of the multiple perspectives based on, at least in part, the context.

17. The computing device of claim 15, wherein the memory has further executable instructions stored therein to
cause a display of data indicating a number of the multiple perspectives; and
receive additional input data indicating a modification to the number of the multiple perspectives or a position of at least one perspective of the number of the multiple perspectives.

\* \* \* \* \*